United States Patent [19]

Kawasaki

[11] 4,260,399
[45] Apr. 7, 1981

[54] METHOD OF REMOVING TAR MIST AND APPARATUS THEREFOR

[75] Inventor: Takuya Kawasaki, Takarazuka, Japan

[73] Assignee: Nikku Industry Co., Ltd., Hyogo, Japan

[21] Appl. No.: 108

[22] Filed: Jan. 2, 1979

Related U.S. Application Data

[63] Continuation-in-part of Ser. No. 715,637, Aug. 18, 1976, abandoned.

[51] Int. Cl.³ .................... B01D 53/04; B01D 46/04
[52] U.S. Cl. ........................................ 55/74; 55/96; 55/97; 55/262; 55/286; 55/430
[58] Field of Search ............... 55/96, 97, 261, 262, 55/286, 300, 304, 341 R, 350, 524, 266, 74, 430; 210/75, 93

[56] References Cited

U.S. PATENT DOCUMENTS

| T950,001 | 9/1976 | Meyers | 55/96 |
|---|---|---|---|
| 1,925,413 | 9/1933 | Smith | 55/524 |
| 2,347,927 | 5/1944 | Patterson et al. | 210/75 |
| 3,679,052 | 7/1972 | Asper | 210/75 |
| 4,010,013 | 3/1977 | Murayama | 55/262 |

FOREIGN PATENT DOCUMENTS

| 2001594 | 7/1971 | Fed. Rep. of Germany | 210/75 |
|---|---|---|---|
| 2548948 | 5/1976 | Fed. Rep. of Germany | 55/430 |
| 2616267 | 10/1976 | Fed. Rep. of Germany | 55/97 |

Primary Examiner—David L. Lacey
Attorney, Agent, or Firm—Armstrong, Nikaido, Marmelstein & Kubovcik

[57] ABSTRACT

In filtering a tar mist-containing gas to remove the tar, a filter bag having an inner surface and an outer surface is coated with a tar absorbent powder by feeding the powder into the top of the bag for free-fall therethrough while maintaining a slightly reduced pressure outside the bag to deposit the powder on the inner surface of the bag and then feeding the tar mist-containing gas into the filter bag while maintaining a greatly reduced pressure outside the filter bag to collect a layer of tar on the coating, and thereafter stripping the powder containing the absorbed tar from the inner surface of the filter bag.

6 Claims, 1 Drawing Figure

U.S. Patent
Apr. 7, 1981
4,260,399
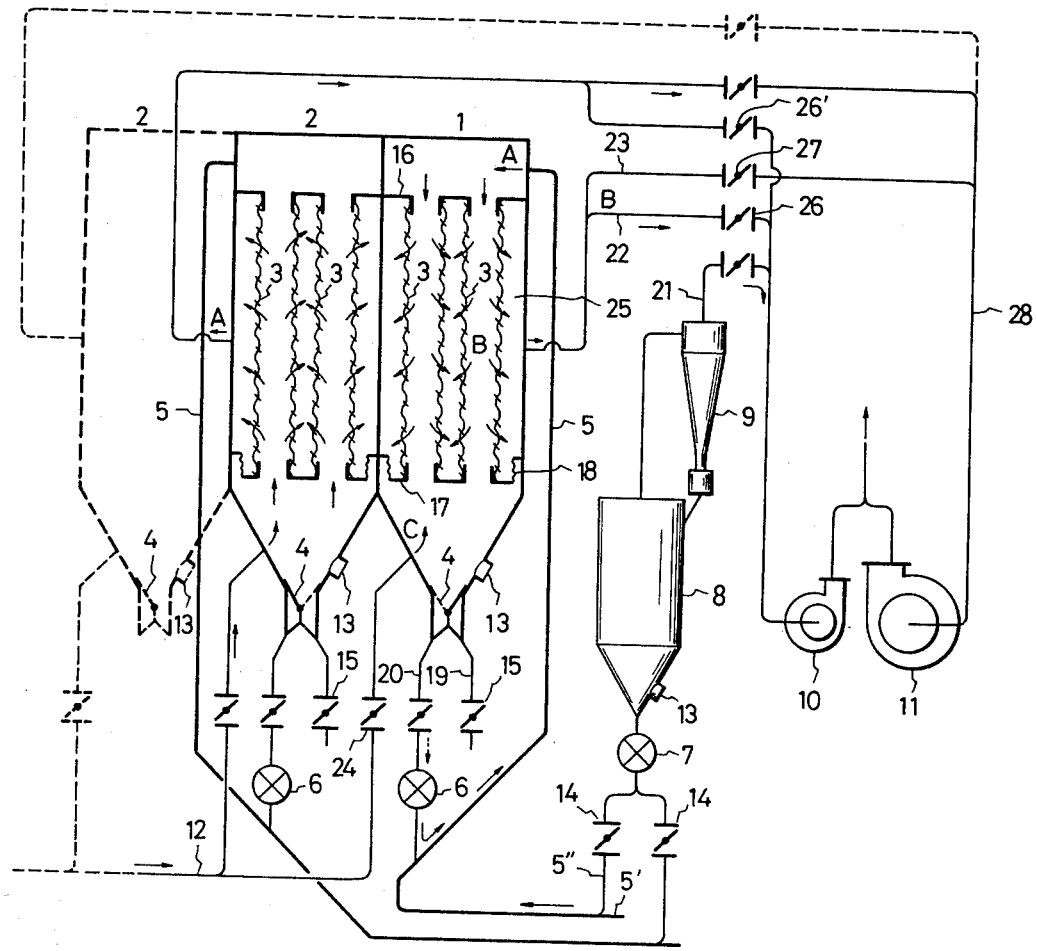

METHOD OF REMOVING TAR MIST AND APPARATUS THEREFOR

RELATIONSHIP TO PREVIOUSLY FILED APPLICATION

This is a continuation-in-part of copending U.S. application Ser. No. 715,637, filed Aug. 18, 1976 and now abandoned.

BACKGROUND OF THE INVENTION

The invention relates to a method of, and an apparatus for, preventing the dispersion of tar mist into the atmosphere wherein removing of tar mist and the like can be accomplished at high efficiency for a long time without clogging the meshes of the filters.

DESCRIPTION OF THE PRIOR ART

In order to increase durability of refractory bricks or carbon electrodes, these materials are immersed in tar melted at a high temperature so as to cause the refractory bricks, etc. to be thoroughly impregnated with tar. In this tar impregnation process, a great amount of tar mist is generated and dispersed into the atmosphere, creating a serious pollution problem.

Various methods have been tried for removing the tar mist but none has been found to be entirely successful.

Electrostatic precipitators are widely used in dust collecting systems but, in the present system, tarry constituents adhere to the electrodes and form an insulating layer thereon which reduces the dust collecting action in short time. Also, it is difficult in operation to remove tar from electrodes.

In the case of a filtration system using bag filters, tar adheres to the bag filters and clogs the meshes, thereby greatly reducing the filtration capacity.

Accordingly, it is hardly possible to use a conventional dust collecting or filtration system. Instead, as a method for overcoming the above drawbacks, it has been proposed that bag filters be coated with fine powder having tar absorbability and air containing tar mist be passed therethrough, causing the tar mist to be absorbed to the fine powder. However, if the fine powder is not distributed uniformly over the filter surface, air tends to flow through portions of lower resistance rather than through the portions having tar-mist absorbent coating, blinding the uncoated portions to further passage of air and resulting in early reduction or loss of tar mist-absorbing capacity.

Methods which use tar absorbing fine powder may be superior to other dust collecting or filtering ones. However, it is an important condition that the tar absorbing fine powder be uniformly distributed over the carriers (for example, bag filters). If a fine-powder layer of uniform thickness is formed over the carrier, ventilation through the fine-powder layer can be effected uniformly, resulting in uniform absorption of tar mist. Moreover, if the tar mist is absorbed uniformly, the operative period will be longer, tar contamination to the carrier will be reduced and operation to remove fine powder from the carrier will be simplified.

SUMMARY OF THE INVENTION

The present invention has the object of avoiding the disadvantages of the prior art and providing a method of removing tar mist and the like and an apparatus for carrying out the same. The method is characterized in that the outside of longitudinally mounted bag filters is maintained at a reduced pressure while tar-absorbing fine powder is fed into an upper portion of the bag filters, causing layers of tar-absorbing fine powder to be deposited uniformly over the inside of the filters, and the tar-mist containing air is supplied into said bag filters and passed through said tar-absorbing fine-powder layers which catch the tar constituents. Thereafter, the tar-absorbing fine-powder layers with the deposited tar constituents are stripped from the bag filters for appropriate disposal or use.

BRIEF DESCRIPTION OF THE DRAWING

The figure is a diagrammatical side view of an apparatus according to the present invention.

DESCRIPTION OF THE PREFERRED EMBODIMENT

The invention will be described further with reference to the accompanying drawing.

The apparatus of the present invention includes collecting tanks 1 and 2 having movable tubular bag filters (or filter cylinders) 3, the inner surfaces of which are coated (precoated) with fine powder. Each collecting tank is of generally cylindrical shape having a cone portion at the bottom, and is closed at the top. Filters 3 are supported between plates 16 and movable support plates 17 so that the latter can be rocked or vibrated by means of elastic bodies 18. Below the lower cone portion of the collecting tank, a change-over plate or gate 4 is provided for switching the flow of solids from one outlet line 19 to another 20. One of outlet lines 19 has a contaminated powder discharge valve 15 and the other pipe line 20 communicates with a fresh air feeding pipe 5 via a rotary feeder 6 for recovery of fine powders.

Dry fine powder storage tank 8 has a cone bottom which is provided with a bridge breaker 13. Material is drawn from tank 8 through constant volume feeder 7, valve 14 and lines 5″ and 5′ to pipe 5. Mounted above said dry fine powder storage tank 8 is a cyclone 9, and exhaust duct 21 which is connected with auxiliary fan or blower 10 of low capacity for pulling a vacuum around filters 3 during the precoating step described above.

Conduit line 22 connects tank 1 with blower 10 and valve 26 controls the flow of gases through line 22. Conduit line 23 leads from tank 1 to the main blower 11, the flow being controlled by valve 27.

A tar mist containing air is fed through line 12 into a lower or cone portion of collecting tank 1 or 2, depending on which one is then on-stream, the flow being controlled by valves 24 and 24′. Each cone portion is provided with a bridge breaker 13 for breaking bridges of fine powders at the lower portion of the collecting tanks 1 and 2.

The tar absorbing fine powder used according to the present invention is one that readily will absorb tar and which can be readily deposited on and separated from a support body such as the filter cylinders 3, for example, clay, diatomaceous earth, pearlite, fly ash or the like. Grain size must be such that it can be entrained in a stream of air for deposition on the filters and retained thereon during use. On the other hand, it cannot be so fine that flow of air through the coating will be undesirably impeded. Also, it must not be so large that it will not stick to the vertical walls of the filter 3.

Operation of an apparatus for removing tar mist and the like according to the present invention will be explained as a two-step process referring only to tank 1. However, the description is applicable to tank 2 and any number of additional tanks employed.

A. Step for forming fine-powder layer:

Air space between the outside of the filter cylinder 3 and the collecting tank 1 is maintained at a reduced pressure by auxiliary blower or fan 10 and dry fine powder from storage tank 8 is fed through constant-volume feeder 7; dry, fine powder feeding valve 14 through connecting feed line 5" into line 5 for mixing with air entering through valve 5', which may be any appropriate valve or control device. Thus, the fine powder is fed into the upper portion of the collecting tank 1 as shown by arrow A and is distributed over the inside of the filter cylinder 3.

While the inside space 25 of the collecting tank 1 outside the filter cylinders is maintained at a reduced pressure by means of the blower 10, tar-absorbing fine powder is fed into tank 1 through line 5 entrained in air flowing in the direction of arrow A and becomes attached to the inside of the filter cylinders 3 resulting in formation of the fine-powder layers thereon. Initially, the coating may form unevenly but the uneven portions will be levelled out by the falling fine powders from above so that the final fine-powder layer will be of uniform thickness.

Fine powder which falls through filters 3 without becoming attached to the side walls is returned to the fresh air feeding pipe 5 via the pipe line 20 and the rotary feeder 6 for return to tank 1 and cylinders 3, thereby continuing the forming operation of the fine-powder layers as described above.

B. Step for collecting tar mist:

After the fine-powder layer has been formed uniformly inside the filter cylinders 3 in the previous step, the blower or fan 10 is connected to another collecting tank (for example, the collecting tank 2) through the operation of the valves 26 and 26'. Valve 27 is then opened to permit flow of gases through pipelines 23 and 28, thereby connecting the collecting tank 1 with the main blower 11 and maintaining space portion 25 at a reduced pressure, which is much lower than the pressure employed during the coating step.

The flow of tar-mist laden gas into tank 1 through line 12 and valve 24 enters in the direction shown by arrow C. This air is caused to pass through the fine-powder layers on filters 3 and is exhausted or carried to a further treatment stage (for example, a deodorizing stage) via the main blower 11.

C. Step for removing contaminated fine powder:

The tar mist becomes gradually absorbed by the fine-powder layer of filters 3, with the result that flow of air through the system becomes retarded. With this, the degree of vacuum in the spaced portion 25 rises. When this degree of vacuum has reached a certain value or after a predetermined period of operation, the valve 27 is operated to block the exhaust from tank 1. Next, the change-over plate 4 is shifted to the position shown by the broken line in the FIGURE. Thereafter, the contaminated fine-powder layers are stripped from the filter cylinders 3 by vibrating the movable support plates 17 and/or filter cylinders 3. Thereafter, the discharge valve 15 for contaminated fine powder is opened while the bridge breaker 13 is operated, and thereby the contaminated fine powder with absorbed tar mist is discharged from the collecting tank 1.

After the contaminated fine powder has been stripped from the filter cylinders 3, the change-over plate 4 is operated so as to re-establish flow through line 20 and thereafter the circle of steps A, B and C is repeated.

Said steps A, B and C are carried out in accordance with a suitable time schedule or the flow resistance of the fine-powder layer, but practically their operational conditions may be selected corresponding to respective apparatuses. The operative sequence for respective devices in the above-described steps is only an embodiment, and concretely such an operational sequence may be modified corresponding to fit varying conditions peculiar to each apparatus.

According to the present invention, by introducing the tar absorbing fine powder into an upper portion of filters 3 and allowing it to fall therethrough while the outside of the filters is maintained at a reduced pressure, the fine-powder layers are deposited uniformly over the carriers or filters and the uniform fine-powder layers are obtained in a short time.

As a result, the contaminated air, including tar mist, can be passed through the fine-powder layers in dispersed condition all over the layers, with the result that local clogging of the filter device is prevented. As noted above, if tar mist is attached to the dry tar absorbing fine powder uniformly, the consumption of the fine powder will be minimized and removal of the contaminated fine powder from the filter surface is facilitated.

In carrying out the operation of the present invention, it is essential that the powder-deposition step be carried out at a relatively higher pressure compared with the tar-absorption step. I have found that it is necessary that a low volume blower be employed for the powder deposition step whereas, for the tar absorption step, it is necessary to use a much larger blower which can produce a much greater suction on the vessel. Also, I have found that the suction capacity of the larger blower should preferably be more than two times as great as the capacity of the low volume blower: A preferred range of the pressure drop for the powder deposition step is from $-100$ to $-250$ mm of water, while that for the tar absorpotion step being from $-500$ to $-700$ mm of water. If the suction capacity of the low volume blower is smaller than $-100$ mm aq., it is difficult to obtain a sufficient deposition of fine powder over the filter surface, and when it exceeds $-250$ mm aq., there tends to occur that the tar absorbent powder is precoated in a layer too thick to be suitable for the operation. With the larger volume blower, then, if its suction capacity is below $-500$ mm aq., it is infeasible to effectively draw tar mist onto the powder-precoated filters, and if above $-700$ mm aq., the power requirement becomes too great for the operation to be practical.

In my work, I experienced difficulty in trying to employ a single large blower for effecting the coating step and the tar removal step. When trying to coat with the large blower, the pressure drop could not be uniformly maintained and the layer proved to be uneven. Furthermore, it is desirable to avoid mixing of the air from the power-deposition step with the exhaust gases from the tar-deposition step. Accordingly, I believe that it is necessary to use a main blower for the tar absorption step and an auxiliary blower operating at much lower volume for the fine powder-deposition. This provides a powder layer of much greater, overall uniformity on the filter surface and prevents uneven absorption of tar during the absorption step with the consequent undesirable variations in the filter capacity at various locations on the filter medium.

The present invention will be further explained by the following illustrative, non-limiting examples.

EXAMPLE 1

The apparatus employed was similar to that illustrated in the drawing of the present application. The auxiliary blower had a negative pressure capacity of about −200 mm of water and the main blower had a similar negative capacity of about −600 mm of water. The filter surface was coated with an absorbent powder by feeding it from the top of the unit, while maintaining a suction around the outside of the filter medium. The powder was continuously fed into the system and gradually coated the entire surface. When the pressure drop reached about 150 mm of water, there occurred a sudden lowering of the pressure. At this point, the powder layer was still partly uneven in thickness. On continued operation at the lower pressure, the powder built up more evenly so that, when the pressure drop reached 200 mm, a relatively uniform layer of powder had been achieved.

The lines were then switched and polluted air was drawn through the powder layer using a main blower with its higher capacity. The tar mist was removed with high efficiency. When the absorbent has reached its capacity for tar-absorption, the operation was shut down and the powder layer with the absorbed tar was removed with relative ease.

COMPARATIVE EXAMPLE 1

Using the same apparatus as in Example 1, but depositing the powder by suction from the main high capacity blower, the layer of powder was deposited on the surface. If was found that control of the pressure was difficult, but when the pressure drop reached 200 mm of water, the deposition process was discontinued. It was found that the layer of absorbent was relatively uneven in thickness. On switching to the tar-absorption step, it was found that the tar deposited quickly on the absorbent where the layer was thinner and resulted in considerable clogging of filter and unsatisfactory operation.

COMPARATIVE EXAMPLE 2

This test was carried out using the same apparatus and the same operational conditions as in Example 1, except that the pressure drop in this instance was achieved by throttling the suction valve of the main blower to obtain suction for the power-deposition step. Although the power layer became uniform at the start, a lowering of the flow rate occurred as the deposition continued. The pressure drop at the suction valve fell, resulting in no further deposition. The resulting layer was not of satisfactory uniformity to give satisfactory results for tar-mist removal.

From the foregoing examples, it is clear that for the satisfactory operation of the present process, it is necessary to carry out the powder deposition step using a low capacity blower or fan for providing the suction. This gives a more uniform deposition at a lower pressure drop so that the air is not packed to the point at which flow of gas is impeded.

I claim:

1. A method of removing tar mist from gas containing the same comprising:

(1) maintaining, in an apparatus for absorbing tar from a tar mist-containing gas, the outside of gas-permeable filters mounted vertically in a tar-mist collecting tank at a reduced pressure by means of a low volume first blower while feeding a tar absorbing fine powder entrained in air into an upper portion of the inside of said filters, whereby the fine powder is caused to fall downwardly within said filters and to attach to the inner surfaces thereof, thereby forming a tar absorbing fine powder layer on said inner surfaces;

(2) shutting off said first blower from said collecting tank, further reducing the pressure around said filters by means of a high volume second blower while introducing a tar mist-containing gas into said filters, and withdrawing said gas through said filters, whereby the tar is absorbed by the tar-absorbing fine powder layer, and (3) stripping the fine powder containing the absorbed tar from the filter surface and discharging the powder from the apparatus.

2. The method of claim 1 wherein the tar absorbing fine powder is chosen from the group consisting of clay, diatomaceous earth, pearlite and fly ash.

3. The method of claim 1 wherein said high volume second blower has a suction capacity at least two times as great as that of said low volume first blower.

4. The method of claim 1 wherein the reduced pressure maintained by said low volume first blower is a pressure drop below atmospheric of 100–250 mm of water and that maintained by said high volume second blower is a pressure drop about 500–700 mm of water below atmospheric.

5. Apparatus for removing tar from a tar mist-contaminated gas stream comprising, in combination, a vertical tubular filter element having an inner surface, an outer surface, an open upper end, and an open lower end, a vertical closed vessel having a wall with an inner surface and an outer surface, said closed vessel providing a space surrounding said vertical tubular filter element, an upper gas manifold and a lower gas manifold communicating with said filter element and sealing the upper and lower ends of said filter element from the space surrounding it, support plates mounted on the inner surface of said wall for supporting said filter element, a low volume first blower communicating with the space surrounding said filter element for maintaining a slightly reduced pressure around said filter element, an absorbent storage means communicating with the upper gas manifold and the low volume blower for depositing an entrained powdered tar-absorbent unreactive solid as an absorbent layer on the inner surface of said filter element while passing a stream of gas containing said absorbent entrained therein through said filter element, a high volume second blower communicating with the space surrounding said filter element for maintaining a greatly reduced pressure around said filter element, a source of tar mist-contaminated gas communicating with the lower gas manifold and the high volume blower to provide means for passing said tar mist-contaminated gas through said filter element to absorb the tar on the tar absorbent, means for dislodging the tar absorbent from said element, and means for discharging the dislodged tar absorbent from said apparatus.

6. The apparatus of claim 5 wherein said high volume blower has a suction capacity at least two times as great as that of said low volume blower.

* * * * *